Aug. 23, 1955  G. R. ANDERSON ET AL  2,716,196
ENCLOSED MOTOR-TRANSFORMER APPARATUS
Filed April 8, 1954  5 Sheets-Sheet 1

INVENTORS
GORDON R. ANDERSON
JOHN W. HICKS
BY
Paul L. Keehn
ATTY.

Aug. 23, 1955  G. R. ANDERSON ET AL  2,716,196
ENCLOSED MOTOR-TRANSFORMER APPARATUS
Filed April 8, 1954  5 Sheets-Sheet 2

INVENTORS
GORDON R. ANDERSON
JOHN W. HICKS
BY
ATTY.

Aug. 23, 1955 G. R. ANDERSON ET AL 2,716,196
ENCLOSED MOTOR-TRANSFORMER APPARATUS
Filed April 8, 1954 5 Sheets-Sheet 3

INVENTORS
GORDON R. ANDERSON
JOHN W. HICKS
BY
Paul L. Krohn
ATTY.

Aug. 23, 1955  G. R. ANDERSON ET AL  2,716,196

ENCLOSED MOTOR-TRANSFORMER APPARATUS

Filed April 8, 1954  5 Sheets-Sheet 4

INVENTORS
GORDON R. ANDERSON
JOHN W. HICKS
BY
Paul L. Krohn
ATTY.

United States Patent Office 2,716,196
Patented Aug. 23, 1955

2,716,196
ENCLOSED MOTOR-TRANSFORMER APPARATUS
Gordon R. Anderson and John W. Hicks, Freeport, Ill., assignors to Fairbanks, Morse & Co., Chicago, Ill., a corporation of Illinois Application April 8, 1954, Serial No. 422,720
15 Claims. (Cl. 310—68)

This invention relates to improvements in the form, construction and energization of enclosed electrical or electromagnetic apparatus such as motor means for translating electrical energy to mechanical energy as reflected for example, in a power output shaft or the like, and has to do more especially with apparatus of such nature suitable or intended for use in a manner and under conditions wherein fluid under pressure, and particularly fluid at high pressure and temperature, may enter and fill the housing enclosing the apparatus.

In electric motor operation of pumps, valves and other operating devices employed in fluid handling systems and the like, it is the usual practice in many instances to utilize packing glands and running seals of various forms, as a means for sealing motor drive connections to such fluid handling or control devices for preventing or minimizing fluid leakage. In many cases, such sealing expedients are employed in connection with the drive motor, as in instances of relatively close-coupled motor-pump, motor-valve and other such units, in order to prevent entrance of leakage fluid into the motor. This is quite important where the fluid treated by the motor driven unit is of caustic or other nature which if permitted to enter the motor, would cause damage to the parts of the motor, and especially the motor windings.

While shaft seals have been used for the purpose, it is known also, to provide pump and like unit drive motors wherein the motor rotor and stator parts are separated by imperforate wall means including wall portions extending through the air gap of the motor. With such construction, the motor is in a fluid-tight chamber, with the stator externally thereof and hence removed from any contact by leakage fluid which may enter the rotor chamber by reason of leakage along the rotor shaft or direct communication of the chamber with the fluid housing or other enclosure of the pump, valve or other fluid handling device driven by the motor. Where the motor rotor is of the induction type, it may be adapted to withstand otherwise damaging effects of many liquids and other fluids. However, in the handling of fluids under pressure, and where the pressure of the system may be present in the rotor-sealing chamber, the sealing wall means necessarily must be reinforced, particularly in the relatively thin portion thereof in the air gap region of the motor. Provisions for adequate support-backing of such wall means are known and have been utilized in instances of relatively low-pressure systems. In the case of high pressure systems involving fluid pressures of the order of one thousand or more pounds per square inch, sealing-in of the rotor in the manner above indicated, would be most difficult and costly of attainment, if at all feasible. The same is generally true as to preventing leakage fluid access to the motor by motor shaft seal means.

Again in connection with high pressure systems, were the entire motor totally enclosed by a casing of sufficient strength to withstand the high fluid pressure of the system, major difficulties would be encountered in the use of conventional forms of motors therein, among such difficulties being that of effectively insulating field windings from short-circuiting fluid contact, and that of effectively sealing not only the casing openings through which extend the motor power leads, but also sealing about the leads in their extension through such openings.

Accordingly, an important object of this invention is to provide an improved motor device suitable in particular for operation of devices such as pumps, valves and the like, provided for high pressure fluid handling systems, wherein the motor by its improved construction and manner of energization from an external power source, avoids all of the difficulties and disadvantages herein above pointed out, as well as others not herein enumerated.

Another object of the invention is to provide an improved motor device adapted for close-coupled operating association with a pump, valve or the like, provided for fluid handling systems involving fluids under high pressure and temperature conditions, wherein the motor device includes motor means in an enclosing housing and directly exposed therein to fluid entering from the fluid system and filling the housing, and wherein the motor means is energized from an external power source through inductive means effective through the wall of the enclosing housing.

A further object is to provide a motor device of the character indicated, embodying improved construction and arrangement of parts in a sealing housing adapted for withstanding fluids under high pressure and temperature conditions, and wherein the motor means in the housing is energized from an external power source through a transformer having its secondary within the housing, its primary externally on the housing, and magnetic means embedded in the housing wall for magnetically coupling the primary and secondary magnetic core elements of the transformer.

The foregoing and other objects and advantages afforded by the present invention will appear from the following description of a presently preferred embodiment of the invention as illustrated by the accompanying drawings, wherein.

Figure 1:
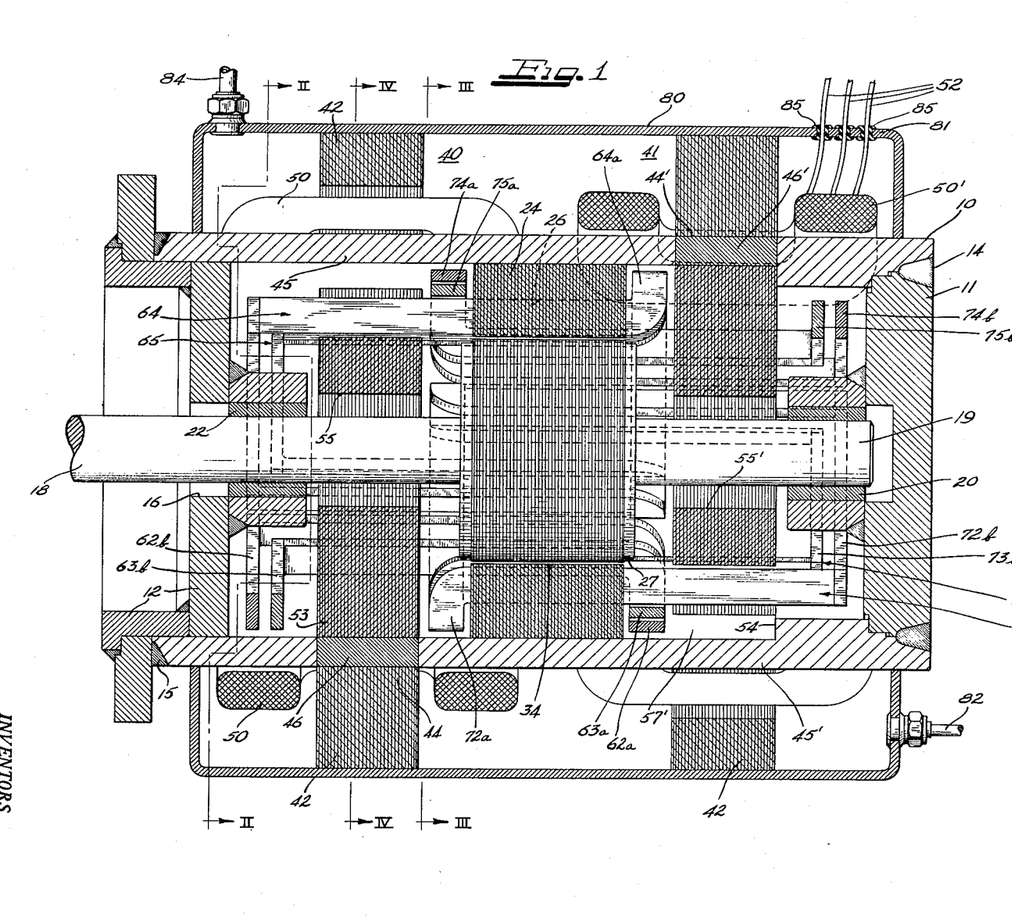
Fig. 1 is a longitudinal sectional elevation centrally through the motor apparatus of the present invention.
Figure 10:
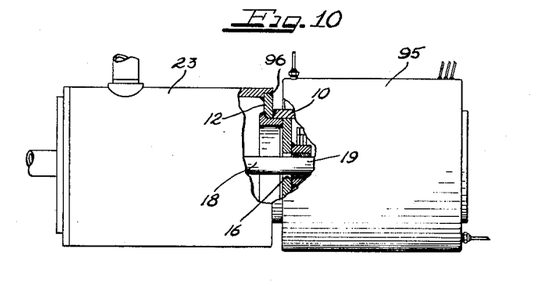
Fig. 10 illustrates the motor apparatus of the present invention, in operating association with a device to be actuated thereby, with portions of both broken away for illustration as to fluid communication between the devices.

Referring now to the drawings, Fig. 1 is a longitudinal sectional view of the presently improved motor apparatus meeting the objectives and advantages of the present invention. As there shown, the apparatus provides an enclosing casing or housing including a tubular housing member 10, one end closure wall 11 and an opposite end wall structure 12, both end walls being suitably secured to the member 10 as by welding at 14 and 15, respectively. The end enclosure structure 12 is provided with a central opening 16 to accommodate the projecting end 18 of a shaft element 19, the shaft extending longitudinally in the housing axially therein and rotatably supported by suitable bearings 20 and 22 carried by the end closures 11 and 12, respectively. Shaft end 18 is provided for operating connection to the rotor of a pump (not shown) or the movable element of a valve or other control device (not shown) to be operated by the motor device. As illustrated by Fig. 10, the motor housing is adapted for sealed connection to the casing 23 of the device to be motor driven, while the shaft end 18 extends freely through the opening 16 of housing end closure 12 with appreciable clearance therein such that high pressure fluid in the casing 23 may enter the motor housing through said opening 16. Consequently, the motor housing structure is formed of strong material and in such sectional thickness as to afford a rigid housing capable of adequately withstanding high internal pressures, as pressures of the order of one thousand pounds per square inch or more. For the purpose hereof, the tubular member 10, as well as the end closures 11 and 12, is provided of non-magnetic stainless steel or other non-magnetic material of equivalent strength, characterized by adequate resistance to corrosive and other effects of the fluid handled in the system with which the pump, valve or other unit driven by the motor is employed.

Disposed in the central region of the tubular member of the housing and preferably press-fitted therein, is an annular motor stator core member 24 of magnetic material and preferably of laminated construction, the core providing conductor slots 26 (Figs. 3 and 6) around its inner periphery 27. Cooperating with the stator core is a motor rotor structure 28 suitably secured upon shaft 19, the rotor being of induction type providing a core 30 of laminated, magnetic material and embodying a closed, squirrel-cage winding (not shown), and having its periphery 32 in relatively close running clearance with the inner periphery 27 of the stator core, to form the motor air gap 34.

Figure 3:
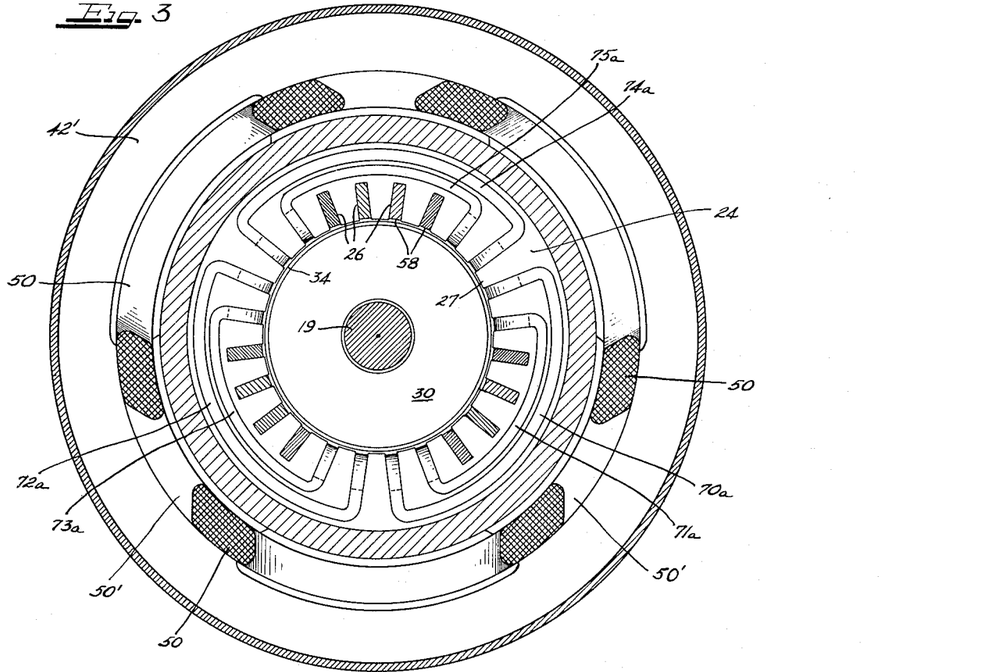
Fig. 3 is another transverse sectional elevation as taken along line 3—3 in Fig. 1.
Figure 4:
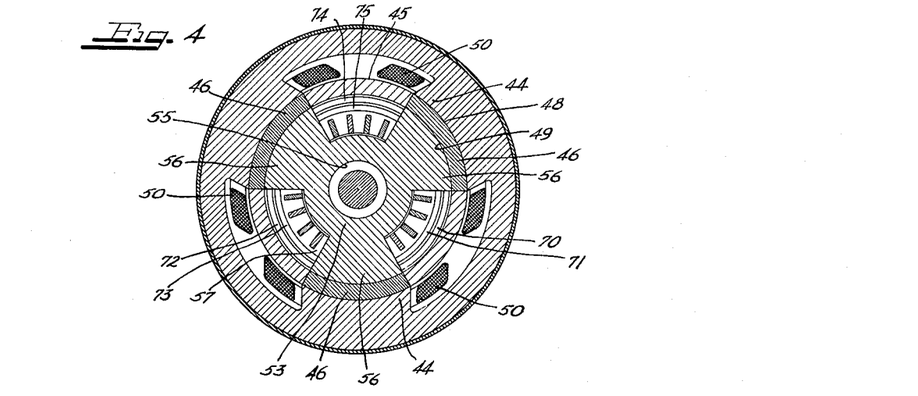
Fig. 4 is a further transverse sectional elevation in reduced scale, as taken along the line 4—4 in Fig. 1, wherein the conductor elements are omitted for clarity of illustration of certain constructional features of the apparatus.

Turning now to the motor stator field winding and the manner of inductive energization thereof from a power source external to the housing as contemplated by the present invention, the field winding presently to be described, is inductively energized through transformer means which in the present embodiment is of split-form, providing two similar transformer sections generally designated by the numerals 40 and 41. Referring first to the section 40, the transformer power input or primary structure thereof includes an annular primary core element 42 of laminated magnetic material, arranged concentrically of the tubular housing 10 on its exterior and near the housing end closed by the closure wall structure 12. Core element 42 is formed further, to provide a plurality of primary core legs 44, here three in number (Figs. 2 and 3), projecting radially from the inner periphery of the core to the wall portion 45 of the tubular housing, with the legs equally angularly spaced as shown in Fig. 4. Firmly secured or embedded in the housing wall 45 so as to be in effect integral parts of the wall, are three wall insert elements 46 (Figs. 1 and 4) of magnetic material, these being relatively equally angularly spaced circumferentially of the wall and in a common plane transversely of the housing. Each wall insert has its outer surface or face 48 exposed to the exterior of the housing, and its opposite face or surface 49 similarly exposed to the housing interior, with each face preferably flush with the surrounding surface of the wall 45. The wall inserts receive the primary core legs 44 in firm magnetic engagement with the outer faces 48 thereof. Embracing each of the legs 44 is a transformer primary winding 50, these windings being suitably related in a primary circuit (not shown) and connected (not shown) to an alternating current power supply represented by the power leads 52 (Fig. 1), which in the present example supplies polyphase, as three phase, power to the transformer.

Figure 5:
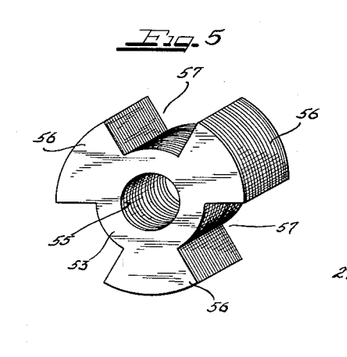
Figs. 5, 6 and 7 are oblique views on a reduced scale, showing respectively, one of the transformer secondary core elements, the motor stator core member, and an associated set of conductor loops shown with one end connection of each separated from the loop.

The secondary of the transformer section 40 includes an annular secondary core element 53 (Figs. 1, 4 and 5) of laminated magnetic material, which is arranged in the housing 10 in said transverse plane of the wall inserts so that the core is adjacently spaced from one side of the motor stator core member 24, with the cores 53 and 24 generally parallel as shown. Secondary core 53 which has its central opening 55 accommodating the shaft 19 freely therethrough, is formed to provide secondary core legs 56 projecting radially from the core periphery, the core thus having peripheral recesses or spaces 57 between the core legs. The core legs extend to firm magnetic engagement with the wall inserts 46 at the inner exposed faces 49 thereof, attained as by press-fitting the core in the housing. Thus the transformer secondary core element within the housing 10, is magnetically united with the primary core element outside of the housing, by the magnetic wall inserts 46.

The other transformer section 41 located near the other end of the housing 10, is in all major respects, the same as the described section 40, so that the parts thereof corresponding to those of section 40 are here designated by the same reference characters differentiated, however, by primes. Thus, primary core element 42' has legs 44' in magnetic engagement with wall inserts 46' in housing wall portion 45' at the opposite side of the stator core member 24, while primary windings 50' embracing the legs 44', are related in a primary circuit (not shown) connected to the power leads 52. In the housing 10 and in spaced, parallel relation to the motor stator core 24, is the secondary core element 53' seated against an internal housing shoulder 54 and having central opening 54' accommodating shaft 19 therethrough. The core provides secondary core legs 56' in magnetic engagement with wall inserts 46', and spaces or recesses 57' between the legs. In providing the transformer sections 40 and 41 and for a purpose to appear, these sections occupy relative positions wherein the core legs and wall inserts of one section are angularly displaced circumferentially of the housing 10 from the corresponding elements of the other section. Thus, the wall inserts 46' are aligned longitudinally of the housing, with the housing wall portions between the wall inserts 46, and hence the primary core legs 42' are longitudinally opposed to the spaces between primary core legs 42, while the secondary core legs 56' are longitudinally opposed to the spaces between the core legs 56. This relationship of the cores appears in the view of Fig. 1 and is illustrated in part by Fig. 9.

Figure 8:
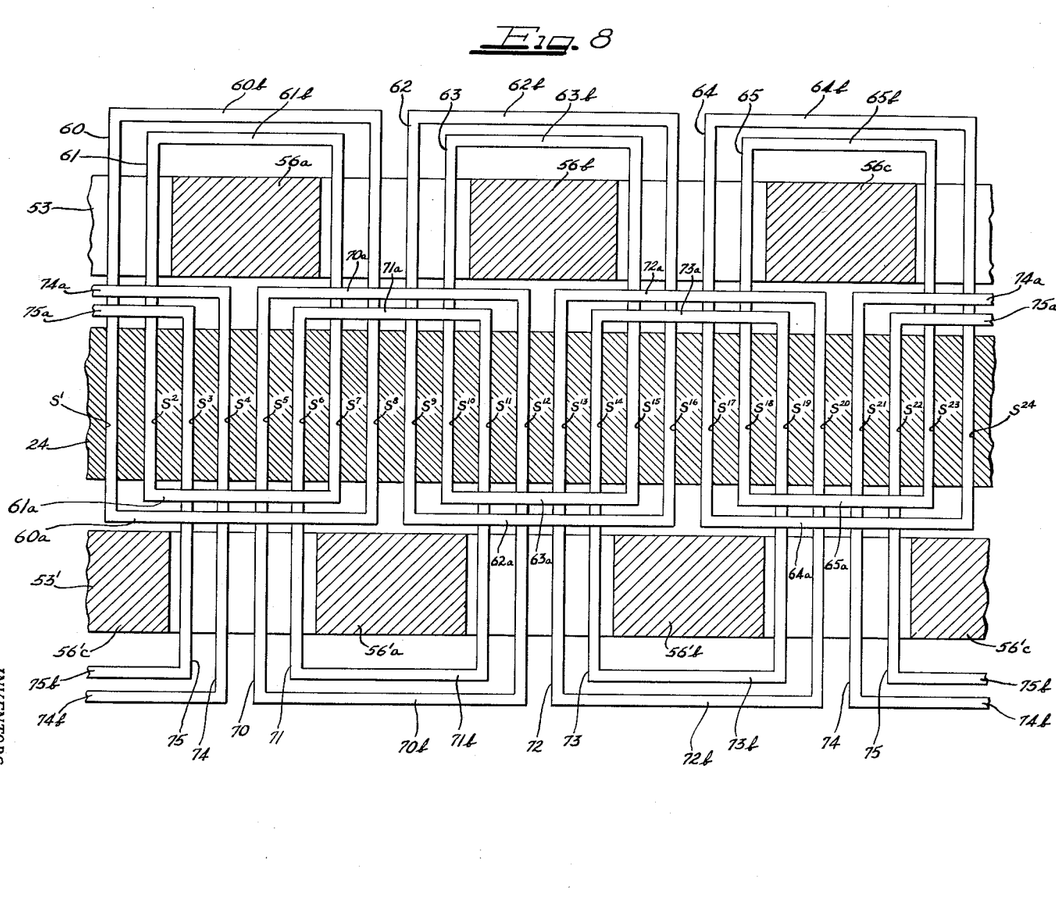
Fig. 8 is a planar developed view of the motor stator core, transformer secondary cores and the combined motor and transformer secondary windings therefor, with such windings shown partly diagrammatically.

As shown by Fig. 1 and the developed view of Fig. 8, the motor stator winding and the transformer secondary windings are provided by conductors of copper or other good conducting material, which in the present example are bare copper bars of rectangular shape in section, formed to present closed conductor loops. As herein disclosed by way of example only, and not in a limiting sense, there are twenty-four equally spaced conductor slots 26 in the motor stator core 24, these slots being identified in the developed view of Fig. 8, in successive order as $S^1$, $S^2$, $S^3$, $S^4$, $S^5$, . . . $S^{24}$. All of the closed loop conductors are carried by the motor stator core in the slots thereof, being secured therein in any suitable manner including slot-closure elements or so-called slot pegs 58 (Fig. 3). Moreover these conductors extend to the secondary core legs of the transformer secondary cores in the manner now to be described.

Referring to Fig. 8, closed loop conductor 60 has its legs in slots $S^1$ and $S^8$ and extends laterally from the motor stator core 24 toward and to encircling or linking relation to one core leg 56a of the secondary core 53 in transformer section 40. Similarly, closed loop conductor 61 disposed concentrically inside of loop 60, has its legs in slots $S^2$ and $S^7$ and extends to linking relation with secondary core leg 56a. In like manner, concentrically related closed loop conductors 62 having its legs in slots $S^9$ and $S^{16}$, and 63 having its legs in slots $S^{10}$ and $S^{15}$, extend to linking relation with the next adjacent secondary core leg 56b, while concentrically related closed loop conductors 64 having its legs in slots $S^{17}$ and $S^{24}$, and 65 having its legs in slots $S^{18}$ and $S^{23}$, extend to linking relation with the remaining secondary core leg 56c. A like conductor arrangement is provided between the motor stator core and the secondary core 53' of transformer section 41. Thus, concentrically related closed loop conductors 70 having its legs in slots $S^5$ and $S^{12}$, and 71 having its legs in slots $S^6$ and $S^{11}$, extend laterally from the other side of core 24 to linking relation with the secondary core leg 56'a of secondary core element 53'. Similarly, concentrically related loop conductors 72 having its legs in slots $S^{13}$ and $S^{20}$, and 73 having its legs in slots $S^{14}$ and $S^{19}$, extend to linking relation with secondary core leg 56'b, while concentrically related loop conductors 74 having its legs in slots $S^{21}$ and $S^4$, and 75 having its legs in slots $S^{22}$ and $S^3$, extend to linking relation with the remaining secondary core leg 56'c.

From the foregoing, it now will be observed that all of the loop conductors 60 to 65 and 70 to 75 constitute the field winding of the motor, while the loop conductors 60 to 65 provide the secondary winding of the transformer section 40, and the loop conductors 70 to 75 provide the secondary winding of the other transformer section 41. Thus with three-phase energization of the primaries of the transformer sections 40 and 41, the induced three-phase outputs of the transformer secondaries within the enclosing housing 10, are directly reflected in the conductors of the motor stator to produce the desired field excitation of the latter.

Figure 2:
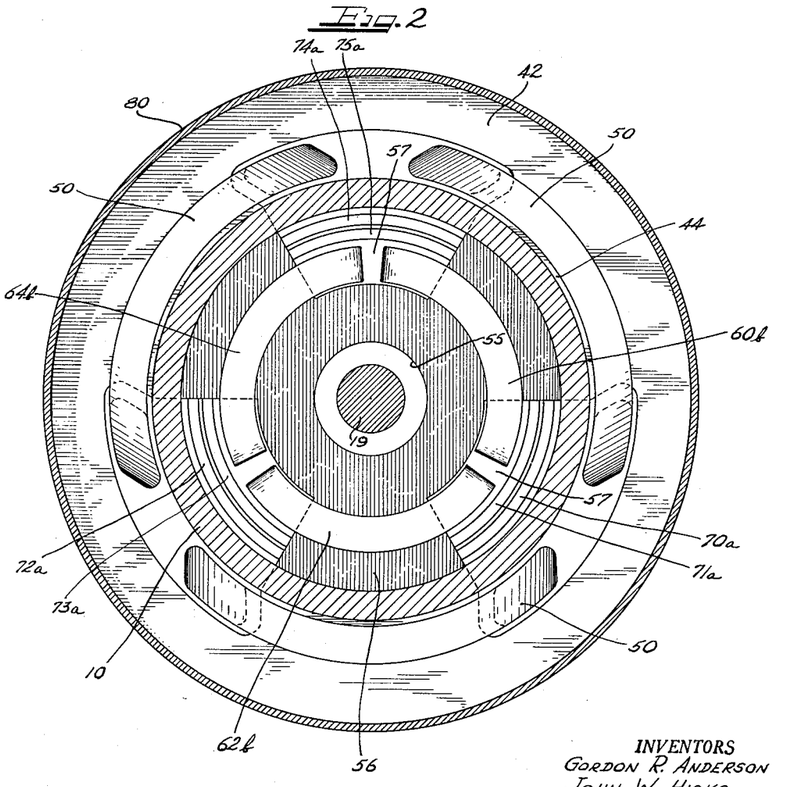
Fig. 2 is a transverse sectional elevation as taken along line 2—2 in Fig. 1.
Figures 6, 7:
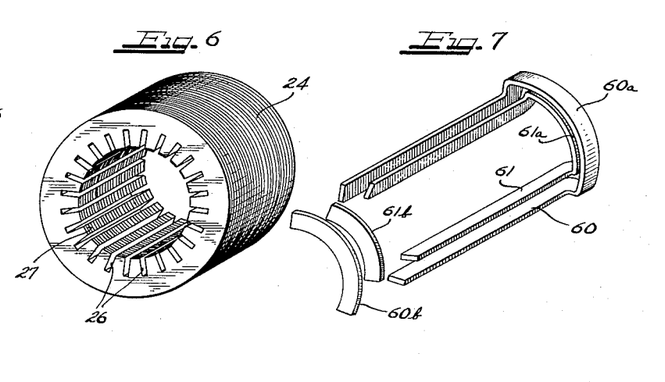
Figure 9:
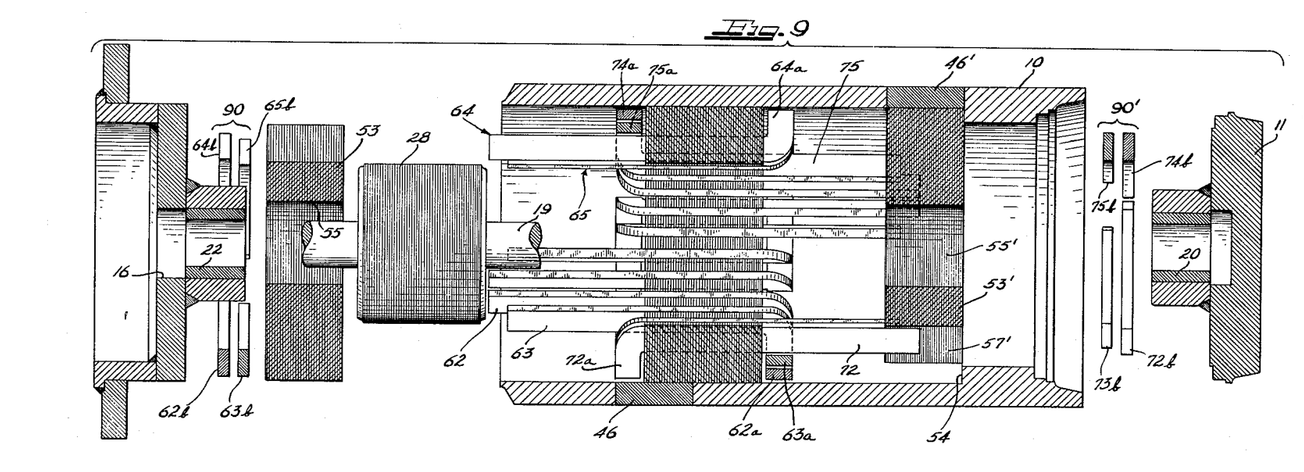
Fig. 9 is a sectional exploded view of the motor and transformer parts for assembly internally of the tubular housing shown, the view being in reduced scale.

As shown by the development view of Fig. 8, the paired loop conductors 60 and 61 lap the two pairs of conductors 74—75 and 70—71, while the pair 62—63 lap the two pairs 70—71 and 72—73, and the pair 64—65 similarly lap the two pairs 72—73 and 74—75. Conversely, a like relation is present in respect to the paired loop conductors 70—71, 72—73 and 74—75 lapping the conductors 60 to 65. Hence, in order to accommodate such lapped relation of the conductor loops, the conductor leg-joining end portion of each which is adjacent the motor stator core, is formed so as to bridge over the underlying leg elements of the lapped conductors. Thus, the ends 60a and 61a of loop conductors 60 and 61 respectively, are displaced as indicated in Figs. 1, 7 and 8, to bridge over the underlying legs of loop conductors 70, 71, 74 and 75, while in like manner and as best understood by reference to the developed view of Fig. 8, the ends 62a and 63a of conductors 62 and 63 respectively, are formed to bridge over the underlying legs of conductors 70, 71, 72 and 73, and the ends 64a and 65a of the conductors 64 and 65 respectively, are formed to bridge over the underlying legs of conductors 72, 73, 74 and 75. Likewise, the ends 70a and 71a of conductors 70 and 71 respectively are formed to bridge over the underlying legs of conductors 60, 61, 62 and 63, while the ends 72a and 73a of conductors 72 and 73 respectively, are formed to bridge over the underlying legs of conductors 62, 63, 64 and 65, and the ends 74a and 75a of conductors 74 and 75 respectively, are formed to bridge over the underlying legs of conductors 64, 65, 60 and 61. All of the bridging ends of the loop conductors are extended in an arcuate trend corresponding to the curvature of the stator core member 24 (as indicated in Figs. 1, 3 and 9), while the opposite leg-joining ends of the loop conductors, as the ends 60b, 61b, 62b, 63b, 64b, and 65b of conductors 60 to 65, and the ends 70b, 71b, 72b, 73b, 74b, and 75b of conductors 70 to 75, have a similar arcuate trend (Figs. 2, 7 and 9).

As hereinbefore noted, each loop conductor is comprised of bare copper in bar form, having a rectangular cross-section, and all of the loop conductors are supported by the motor stator core in the slots thereof. Moreover, the conductors in extending to linking association with the core legs of the transformer secondary core elements, embrace these legs without physical engagement therewith or with any other part of the secondary cores. In the present example, the conductor legs received in the slots of the motor stator core member 24 are not insulated from the slot wall surfaces, but directly engage the slot walls through conductor supporting press-fit of the conductor legs in the slots. This is found to be adequate without inordinate losses, where the voltage drop across each loop conductor is relatively low, as of the order of two volts. Such low voltage at the motor field may be readily attained, of course, as by providing the transformer sections 40 and 41 to have the required step-down characteristics with relatively high voltage input to the transformer primaries, and with a determined number of conductor turns or loops in the transformer secondaries. In the three-phase transformer arrangement here illustrated, there are two loop conductors in each phase of the transformer secondary in each transformer unit 40 and 41, but it is to be understood that within practical limits, any other number of loop conductors per secondary phase may be employed in order to meet given requirements. However, in instances requiring a field voltage considerably greater than the low voltage indicated, it may be necessary in order to avoid inordinate losses at the motor field structure, to insulate the conductor leg portions in the slots of the field core. This may be accomplished in any well known manner, as by lining the slots with a suitable fluid and heat resistant material, as a ceramic material or the like.

Referring again to Fig. 1 in particular, the transformer primaries externally on the housing 10 preferably are protected by a cover or casing 80 suitably removably mounted on housing 10 and having openings 81 to accommodate primary power supply leads 52 therethrough. In the present embodiment, the casing 80 is adapted for fluid-tight mounting on housing 10 in order to provide for flow of cooling air or a liquid, as water or oil, through the casing to effect cooling of the transformer primaries and motor cooling through fluid contact with the housing 10. To such end, the casing has an inlet connection at 82, for air or water under low but sufficient pressure to establish and maintain circulation, and an outlet connection at 84. Also, in this instance, the casing openings 81 receiving the power leads 52 therethrough, are sealed about the leads as by suitable rubber grommets 85 or the like.

While the improved motor apparatus as now described, is suitable for close-coupled operation of control and other operating devices in fluid handling systems generally, where fluids at pressure and temperature conditions existing in the system at the device under motor operation, may enter and fill the motor housing, it is especially suitable for application to motor-operated valves in fluid handling systems involving fluids under very high pressures, as in the range of one thousand to two thousand pounds per square inch or greater, and wherein the fluids handled may be at high temperatures, as of the order of three hundred degrees Fahrenheit or of higher order. The motor housing 10 may be readily constructed to withstand such pressure and temperature conditions imposed therein by leakage fluid entering and fillingthe housing, while the improved manner of motor field energization inductively by the described transformer means, wherein the closed conductor loops of bare copper bar material constitute both the field winding and the transformer secondary winding means, and further wherein the motor field energization involves but a relatively low voltage drop per conductor loop, enables effective operation of the motor device submerged in such fluid at high temperature and pressure as indicated.

The motor apparatus is thus adapted for close-coupling to the device to be driven, as a valve, pump or the like, with the housing 10 in sealed connection to the housing or casing of the operated device so as to receive and confine therein, fluid at high pressure and temperature leaking out along the valve stem or pump impeller shaft or otherwise discharging from the operated device in the direction of the housing 10. Hence the presently improved motor apparatus in such connection to the device to be operated, completely eliminates packing or other sealing expedients in respect to the valve stem element, impeller shaft element or other actuated element of the associated device, to which the motor shaft 19 may be operatively connected. It also eliminates shaft sealing of the motor shaft 19 thereof in its projection from housing 10. In these and other respects, it fully avoids the difficulties and disadvantages of other and prevailing forms of so-called sealed motors, as hereinbefore mentioned.

Turning now to the method and manner of effecting assembly of the motor and transformer parts in the tubular housing 10, and referring for this purpose to the exploded view of Fig. 9, and to the view of Fig. 7, the motor stator core member 24 is provided with the several conductor elements in slot-received, mounted condition thereon. In order to expedite assembly, each of the conductor loops is pre-formed, but with the leg connecting end portion thereof opposite its bridge-formed end portion, provided as a separate, arcuate piece. This is illustrated by Fig. 7 in connection with the conductors 60 and 61, wherein the respective bridge ends 60a and 61a are integral with the conductor legs, while the respective arcuate end-pieces 60b and 61b are separate from the legs. Thus as indicated by Fig. 7, the major portion of each loop conductor is initially in the form of a U-shape conductor. These initially U-shape conductors are secured in the core slots 26 so that the legs of those conductors to be linked with one transformer secondary core, project from one side of the stator core, while the legs of the conductors to be linked with the other secondary core, extend from the opposite side of the stator core (as indicated by Fig. 9).

Now and as viewed in Fig. 9, the transformer secondary core element 53′ is inserted at the left hand end of tubular housing 10 and displaced therein to a position against housing shoulder 54 and with the core legs 56′ in firm, press-fit engagement with the inner faces of the housing wall inserts 46′. Even though the core has a press-fit in the housing, in order to assure its retention in proper position the core may be secured to the housing in any suitable manner, as by welds (not shown). Next, the motor stator core 24 having the U-shape conductors in the slots thereof, is inserted at the left end of the housing and displaced therein with the projecting conductor legs at the right hand side of the core (Fig. 9) aligned with the spaces or recesses 57′ between the core legs 56′ of the inserted secondary core 53′. Stator core insertion then is continued until the core occupies the desired predetermined central position in the housing, with the conductor legs projecting beyond the core 53′ and free of contact therewith. In addition to its press-fit in the housing, the motor stator core may be more positively secured in place, as by welds (not shown). Following insertion of the motor rotor 28 and its shaft 19 such as to locate the rotor in the rotor bore of the stator core 24, the remaining transformer secondary core 53 is inserted into position in the left end portion of the housing, with its legs 56 in firm magnetic contact with the inner faces of the wall inserts 46. This core which also has a press-fit in the housing, may be further and positively secured in place, as by welds (not shown). Moreover, in its insertion the core is properly aligned to receive the projecting legs of the conductors to be associated therewith, so that these legs project in and through the spaces or recesses 57 between the core legs 56 and out of contact with any portion of the core.

The next step is to close all the U-shape conductors, as by application of the arcuate pieces (as 60b and 61b in respect to conductors 60 and 61 shown in Fig. 7) to the projecting conductor legs at the opposite ends of the housing. These pieces may be brazed or otherwise secured in good electrical contact with the conductor legs, to result in the closed loop conductors previously described. In Fig. 9, these pieces for closing the conductor legs at the left end of the housing are shown at 90, while the similar pieces for closing the conductor legs at the right end of the housing are shown at 90′.

Having thus assembled the parts in the housing 10, the housing closure wall 11 then is applied and welded to the housing, with the right hand end of the shaft 19 received in the bearing 20. Next is the application of the other end closure wall structure 12 to the casing by welding thereto, and with the shaft 19 received in bearing 22 and its end portion 18 projecting through wall opening 16. The housing 10 with the parts therein, is now complete and ready for application of the transformer primaries externally thereon in proper position as hereinbefore described, followed by application of the primary enclosing casing 80 to the housing, after the necessary power connections are made through leads 52 to the primary windings.

The motor apparatus thus formed and assembled, then may be coupled in operating relation to the device to be operated, as for example in the manner shown by Fig. 10. As here illustrated, the completed motor unit indicated by the numeral 95, has its end wall structure 12 welded at 96 to the open end of a casing 23 which may house a valve, pump or other apparatus (not shown) to be operated from shaft end 18 of the motor shaft 19. Thus the interior of casing 23 has communication with the interior of motor housing 10 through the shaft opening 16, so that fluid, which may be in casing 23, as liquid or gaseous fluid under the pressure and temperature conditions of the part of a fluid handling system in which the unit and its casing 23 are connected, will pass into motor housing 10 and reflect therein the pressure and temperature conditions obtaining in casing 23. The illustration of Fig. 10 also shows quite clearly, how the presently improved motor apparatus adapted as it is for close-coupled connection to the unit to be operated thereby, eliminates any need for shaft packing or seals of any kind.

Having now illustrated and fully described one preferred embodiment of the present invention, it is to be understood that various modifications in the structure and arrangement of the parts thereof may be made without departing from the spirit and scope of the invention as defined by the accompanying claims:

1. Motor apparatus comprising an enclosing housing of non-magnetic material, wall insert means of magnetic material in the wall of the housing with surface exposure to the exterior and to the interior of the housing, a motor device in the housing provided for translating electrical energy to mechanical motion, said motor device including a magnetic field core element, a transformer output core element in the housing having core legs in magnetic engagement with said insert means at the surface exposure thereof in the housing, electrical conductor means comprising bare conductor elements carried by said field core element and extending to and about said core legs in positions free of contact with the latter, and transformer input means externally on said housing, including an input core element in magnetic engagement with said insert means at the surface exposure thereof externally of the housing.

2. Motor apparatus comprising an enclosing housing of non-magnetic material, wall insert means of magnetic material in the wall of the housing, electrical transformer means carried by the housing in magnetic cooperation with said insert means, including an input core externally on the housing and an output core internally of the housing, and a motor device in the housing provided for translating electrical energy to mechanical motion, said motor device including a stator core spaced from said transformer output core and wall insert means, and electrical conductor means carried by the stator core, said conductor means comprising bare conductor elements extending to and about core portions of said transformer output core in positions free of contact with the output core.

3. Motor apparatus comprising an enclosing housing of non-magnetic material, a motor device in the housing for translating electrical energy to mechanical motion, said motor device including a stator core of magnetic material, and electrical transformer means for energizing said motor device, comprising a transformer input including a primary core externally on the housing, a transformer secondary core in the housing in spaced relation to said stator core, said secondary core having core legs, wall insert means of magnetic material in the wall of the housing between said primary core and the core legs of said secondary core, magnetically interconnecting the transformer cores, and substantially rigid conductor elements each provided as a closed loop, extending between and linking said transformer secondary core legs and said stator core of the motor device, said conductor elements being supported solely by said stator core.

4. Motor apparatus comprising an enclosing housing of non-magnetic material, a motor device in the housing for translating electrical energy to mechanical motion, said motor device including a stator core of magnetic material, and electrical transformer means for energizing said motor device, comprising transformer secondary core elements in the housing on opposite sides of the motor stator core in spaced relation thereto, transformer primary means externally on the housing and including a primary core element overlying each secondary core element, wall insert means of magnetic material in the wall of the housing between each secondary core element and its associated primary core element, magnetically interconnecting the core elements, and closed loops of conducting material carried by said motor stator core, certain of said closed loops extending to and linking one of said transformer secondary core elements, and others of said loops extending to the other of said transformer secondary core elements.

5. In a device of the character herein disclosed, an enclosing housing of non-magnetic material adapted for the reception therein of fluid under pressure, motor means in the housing and exposed to fluid therein, said motor means providing a stator core member of magnetic material, a rotor shaft rotatably supported in the housing ad having an output end projecting from the housing, and an induction rotor member on the shaft in position for cooperation with said stator core member, electrical transformer means for energizing the motor means, said transformer means providing primary power input means including a primary core element externally on said housing, a transformer secondary core element in the housing and spaced from said stator core member, wall insert means of magnetic material in the wall of the housing between said primary and secondary core elements, and conductors of closed loop form each extending between and linking said secondary core element and said stator core member, said conductor loops constituting both the transformer secondary winding and an energizing stator core winding for the motor means.

6. The device as defined by claim 5, wherein the said closed loop conductors are exposed for surface contact by fluid in the housing.

7. Motor apparatus comprising a tubular enclosing housing of non-magnetic material, motor means in the housing for translating electrical energy to mechanical motion, said motor means including a slotted stator core member positioned with the slots thereof directed longitudinally of the tubular housing, transformer means for energizing the motor means, including wall inserts of magnetic material in the wall of the housing and relatively angularly spaced circumferentially of the housing, each such insert having one surface exposed on the exterior of the housing wall and its opposite surface exposed to the housing interior, transformer power input means providing a circular primary core element externally on the housing and in magnetic engagement with the external exposed surface of said inserts, a transformer secondary core element of annular form and providing core legs extending from the core periphery to magnetic engagement thereof with the internal exposed surfaces of said inserts, and closed loop conductors carried by said stator core member in the slots thereof and projecting longitudinally of the housing from one side of the stator core member toward said transformer secondary core element, with at least one such conductor extending about each of said core legs.

8. Motor apparatus comprising a tubular enclosing housing of non-magnetic material, a first set of wall inserts of magnetic material in the wall of the housing, said inserts being arranged circumferentially of the housing in one transverse plane thereof and being relatively equally angularly spaced therein, a second set of wall inserts of magnetic material in the wall of the housing, arranged circumferentially therein in a transverse plane of the housing spaced longitudinally from the transverse plane of the first set of inserts, said second set of inserts being relatively equally angularly spaced and disposed such that each insert thereof is opposed longitudinally of the housing wall, to the housing wall portion intervening an adjacent pair of inserts of said first set of wall inserts, each wall insert in each set thereof having its outer surface exposed at the exterior of the housing and its inner surface exposed at the housing interior, motor means in the housing for translating electrical energy to mechanical motion, said motor means including a circular stator core member carried by the housing in a position therein between said sets of wall inserts, said core member having conductor slots directed longitudinally of the housing, transformer means for energizing said motor means, providing first and second secondary core elements of circular form, disposed in the housing on opposite sides of said stator core member, each of said core elements having core legs extending radially from and equally angularly spaced about the core periphery, said first core element being positioned with its core legs in magnetic engagement with the wall inserts of said first set of inserts at the inner exposed surface thereof, and said second core element being similarly positioned with its core legs in magnetic engagement with the wall inserts of said second set at the inner exposed surfaces thereof, the core legs of one core element thus being aligned longitudinally of the housing with the spaces intervening the core legs of the other core element, a plurality of closed loop conductors carried by said stator core member in the conductor slots thereof, arranged in two sets with the loop conductors of one set extending laterally from one side of the stator core member and linking the core legs of said first secondary core element, while the loop conductors of the other set extend laterally from the opposite side of the stator core member to linking relation with the core legs of said second secondary core element, all of said loop conductors constituting the stator core winding of the motor means, while the loop conductors of said one set constitute a secondary transformer winding on said first secondary core element, and the loop conductors of the other set constitute a secondary transformer winding on said second secondary core element, and said transformer means further providing power input means externally of the housing, including first and second primary core elements encircling the housing, said first primary core element having core legs in magnetic engagement with said first set of wall inserts at the outer exposed surfaces thereof, and said second primary core element having core legs in magnetic engagement with said second set of wall inserts at the outer exposed surfaces thereof.

9. Motor apparatus for operating a device included in a fluid handling system involving fluid under high pressure and temperature conditions and wherein the device includes a casing in which such fluid may accumulate, said motor apparatus including an enclosing housing in fluid-sealed connection with said casing and having a wall opening communicating the housing interior with the interior of the casing, through which fluid may enter the housing from the casing, motor means in the housing for translating electrical energy to mechanical motion and providing a mechanical motion output element extending through said wall opening into said casing for operating connection to the device therein, said motor means including a stator core member and a motor field winding carried thereby, said field winding being comprised of a plurality of closed loop conductors, means providing an alternating current power source externally adjacent the housing, and inductive means for energizing said field winding conductors from said power source, comprising transformer means providing primary core means externally on said housing and having primary windings connected to said power source, transformer secondary core means within the housing, said closed loop conductors extending from said motor stator core to linking relation with portions of said transformer secondary core means, and means of magnetic material embedded in the wall of said housing, magnetically connecting said primary and secondary core means.

10. Motor apparatus as defined by claim 9 characterized further by a casing extending about the said enclosing housing and in fluid-sealed support thereon, said casing enclosing the said transformer primary core means and the primary windings thereon, and having fluid inlet and outlet means for the circulation of cooling fluid in and through the casing.

11. In an electrical machine, a rigid and imperforate tubular housing of non-magnetic metal, a rigid imperforate end wall of non-magnetic metal integrally joined to and closing one end of the housing, rigid end wall means of non-magnetic metal integrally joined to the opposite end of the housing and providing a central opening therethrough constituting the sole opening to the housing interior, a bearing centrally on said imperforate end wall within the housing, a bearing on said wall means concentrically of said opening and within the housing, a rotor shaft extending axially in the housing and rotatably supported by said bearings, one end portion of said shaft projecting outwardly of said end wall means through said opening thereof, an induction rotor member fixed on said shaft within the housing, an annular stator field core member mounted within the housing concentrically of said rotor member, said core member providing winding slots therein, a magnetic core element in the housing adjacent one side of said field core member and providing core legs extending to the wall of the housing, magnetic core means externally on the housing, wall insert means of magnetic material embedded in the wall of the housing between said core means and the core legs of said core element, magnetically connecting the core means to said core legs, a field winding comprised of closed loop conductors mounted in said slots of the field core member and extending laterally from the member toward and about said core legs of the core element, a source of alternating current supply, and winding means on said magnetic core means externally of the housing, energized from said supply source.

12. In a device of the character disclosed, a casing formed of non-magnetic material and constructed to withstand high fluid pressures internally thereof, a plurality of insert elements of magnetic material embedded in the wall of the casing with surface exposure of each thereof at both the interior and the exterior of the casing, a power supply transformer including a primary core member mounted externally on the casing in magnetic engagement with said insert elements and an annular secondary core member having core legs, mounted internally of the casing with its core legs in magnetic engagement with said insert elements, motor means in the casing including an annular, slotted stator core in spaced, parallel relation to said annular secondary core member, and a combined motor field winding and transformer secondary winding comprising a plurality of bare conductors of bar form each constructed as a generally rectangular closed loop, said conductors being mounted in the slots of the stator core and projecting laterally toward said secondary core member with at least one such conductor looping about each of the core legs of the latter member, said conductors being free of contact with the core legs and the annular portion of the secondary core member.

13. In a method of forming a motor device of the character disclosed, the steps of inserting a recessed transformer secondary core in an open-ended casing, inserting in the casing a motor stator providing a set of U-shape conductors having the legs thereof projecting from the stator, positioning the motor stator in the casing such that the legs of the conductors extend through the recesses of the secondary core in positions free of contact with the core, and applying a conductor segment in spanning relation to the legs of each conductor and joining the conductor segment in electrical contact with the conductor legs.

14. In a method of forming a motor device of the character disclosed, the steps of inserting a recessed transformer secondary core in an open-ended casing, inserting in the casing a motor stator providing a first set of U-shape conductors having the legs thereof projecting from one side of the stator and a second set of U-shape conductors having the legs thereof projecting from the other side of the stator, positioning the motor stator in the casing such that the legs of the first set of conductors extend through the recesses of the secondary core in positions free of contact with the core, inserting a second recessed transformer secondary core in the casing to a position therein having the legs of the second set of conductors extending through the recesses of the core and free of contact with the core, and applying a conductor segment in spanning relation to the legs of each conductor of the first and second sets and joining the conductor segment in electrical contact with the conductor legs.

15. In a method of forming a motor device of the character disclosed, the steps of inserting a recessed transformer secondary core in an open-ended casing, inserting in the casing a motor stator providing at least a pair of U-shape conductors having the legs of one thereof projecting from one side of the stator and the legs of the other thereof projecting from the other side of the stator, positioning the motor stator with the legs of one conductor extending through the recesses of the transformer secondary core in positions free of contact with the core, inserting a motor rotor and shaft assembly in the casing to a position therein for operative cooperation of the rotor with the motor stator, inserting a second recessed transformer secondary core in the casing to a position having the legs of the other conductor projecting through the recesses thereof and free of contact with the core, thence applying a conductor segment in spanning relation to the legs of each conductor and electrically joining the segment to the conductor legs, applying end closures having shaft bearings, at the open ends of the casing in positions receiving the motor rotor shaft in the shaft bearings thereof, and thereafter hermetically sealing the end closures to the casing.

References Cited in the file of this patent

UNITED STATES PATENTS

| 1,722,284 | Fisher | July 30, 1929 |
| 2,245,577 | Dieckman | June 17, 1941 |

FOREIGN PATENTS

| 10,655 | Great Britain | of 1912 |
| 214,643 | Great Britain | Oct. 16, 1924 |